June 8, 1954  S. A. CRAVOTTA  2,680,643
WEED EXTRACTOR
Filed June 1, 1950

INVENTOR
SAMUEL A. CRAVOTTA,
BY
ATTORNEY

Patented June 8, 1954

2,680,643

UNITED STATES PATENT OFFICE 2,680,643

WEED EXTRACTOR

Samuel A. Cravotta, Arlington, Va.

Application June 1, 1950, Serial No. 165,514

3 Claims. (Cl. 294—50.6)

This invention relates to weed extractors, and more specifically to rotary mechanical means for effecting the extraction.

One of the primary objects of this invention is to provide in a device of the type described, means for enmeshing the root of a weed or obnoxious plant with one or more elongated tines, whereby as the device is rotated the root of the weed becomes further entangled with the tines and rotates therewith until it eventually breaks loose from the surrounding earth or soil.

Another object of the present invention resides in providing a weed extractor with a plurality of rotatable tines which, upon engagement with a weed root will extract the root with but a minimum disturbance and removal of the dirt immediately adjacent thereto.

Other and further objects and advantages of this invention will become apparent from a consideration of the following specification when read in conjunction with the annexed drawing, in which.

Figure 1:
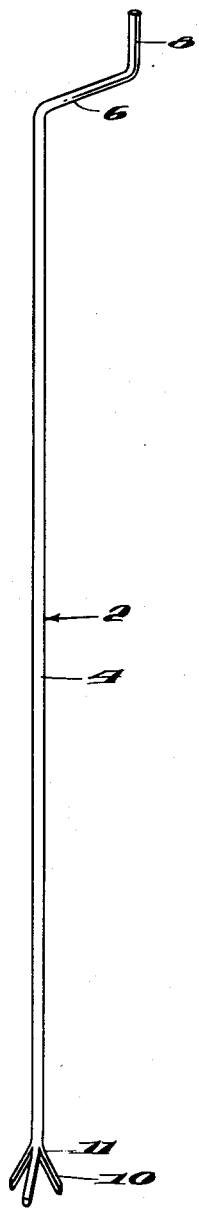
Figure 1 is a perspective view of the invention.
Figure 2:
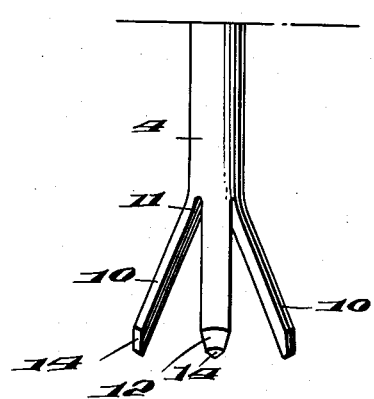
Figure 2 is a partial side elevation of the lower end of the implement.
Figure 3:
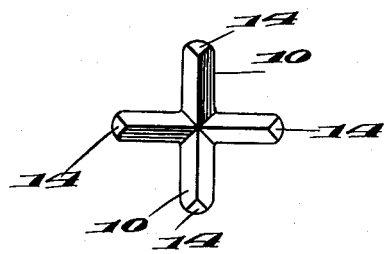
Figure 3 is an end view of the ground engaging tines.

Referring now more specifically to the drawing, the extractor indicated in general by the reference numeral 2 is formed of metal or other suitable materials, and comprises a vertical shaft 4 of circular cross-section. The upper end of shaft 4 is bent at right angles with respect to the shaft to form a lever arm 6. The outer end of lever arm 6 is bent upwardly at right angles to lever arm 6 to provide a handle 8.

As is seen in the drawing, the lower end of shaft 4 is quartered to form a plurality of tines 10. The tines are then bent outwardly and diverge from the longitudinal axis of shaft 4 in evenly spaced relationship, thereby providing an inverted V-shaped slot 11 between adjacent tines. The free ends of the tines are bevelled at 12 to provide tapered, pointed, ground engaging ends 14.

It will be observed that this implement is formed of one piece—the shaft, lever arm and handle being integral.

In operation, the extractor is positioned over the weed stem with the stem projecting upwardly through one of the V-shaped openings 11. The operator then presses downwardly on the upper end of shaft 4 and rotates the extractor by handle 8. Pointed ends 14 are thereby rotated and forced downwardly into the soil. As this operation takes place, the weed stem is forced upwardly to the junction point of the V-shaped slot 11 and the weed root becomes entangled with one or more of the tines 10 and is wrapped and twisted thereabout.

Tines 10 serve to loosen the dirt about the weed root as shaft 4 is rotated, and the side edges thereof serve to cut off any minor branches of the weed root.

When the root is broken loose from the soil, shaft 4 is raised, lifting the weed therewith. The weed may then be removed from the extractor by striking the tines against the ground to loosen the weed therefrom, or, if the weed is firmly wedged in slot 11, the weed may be manually removed.

Having described this invention in detail, it will be understood that the present embodiment is offered by way of illustration, and that the invention is only to be limited by the scope of the appended claims.

I claim:

1. A weed extractor comprising an elongated shaft having oppositely disposed ends, one of said ends being split longitudinally and bent to form a plurality of ground engaging tines integrally formed with said shaft and diverging away from the longitudinal axis of said shaft at one of said ends forming V-shaped slots between each pair of adjacent tines.

2. A weed extractor as defined in claim 1, and a lever arm integral with said shaft, said lever arm extending at an angle to said longitudinal axis of said shaft and having one of its ends connected with the other of said ends.

3. A weed extractor as defined in claim 1, and manually operated means for rotating said shaft, said means comprising a lever arm integrally formed with said shaft and extending at substantially right angles therefrom, and a handle having one of its ends integrally formed with the other end of said lever arm, said handle being positioned at right angles to said lever arm and parallel to said shaft.

References Cited in the file of this patent

UNITED STATES PATENTS

| Number | Name | Date |
|---|---|---|
| 816,536 | Currier | Mar. 27, 1906 |
| 1,549,198 | Haney | Aug. 11, 1925 |
| 2,082,476 | Allen | June 1, 1937 |
| 2,164,373 | Ayliffe | July 4, 1939 |
| 2,194,336 | Tullio | Mar. 19, 1940 |
| 2,402,550 | Hiack | June 25, 1946 |
| 2,492,035 | Doble | Dec. 20, 1949 |

FOREIGN PATENTS

| Number | Country | Date |
|---|---|---|
| 271,752 | Germany | Mar. 20, 1914 |
| 71,561 | Switzerland | Jan. 17, 1916 |
| 174,287 | Switzerland | Mar. 16, 1935 |
| 176,834 | Switzerland | July 16, 1935 |